United States Patent
Penninckx et al.

(10) Patent No.: US 6,836,582 B2
(45) Date of Patent: Dec. 28, 2004

(54) OPTICAL SWITCHING DEVICE AND A METHOD OF CONTROLLING THE DEVICE

(75) Inventors: Denis Penninckx, Nozay (FR); Olivia Rofidal, Bure sur Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/331,322

(22) Filed: Dec. 31, 2002

(65) Prior Publication Data

US 2003/0128913 A1 Jul. 10, 2003

(30) Foreign Application Priority Data

Jan. 3, 2002 (FR) .......................................... 02 00039

(51) Int. Cl.[7] .............................................. G02B 6/26
(52) U.S. Cl. ............................ 385/16; 385/17; 385/18
(58) Field of Search ..................................... 385/16–24

(56) References Cited

U.S. PATENT DOCUMENTS

| | | | | |
|---|---|---|---|---|
| 4,521,069 A | * | 6/1985 | Ikeda | 385/16 |
| 5,365,358 A | * | 11/1994 | Stein | 398/55 |
| 5,471,332 A | * | 11/1995 | Shiragaki et al. | 398/45 |
| 5,680,220 A | * | 10/1997 | Delignieres et al. | 356/406 |
| 5,896,212 A | * | 4/1999 | Sotom et al. | 398/55 |
| 6,134,031 A | * | 10/2000 | Nishi et al. | 359/15 |
| 6,347,168 B1 | * | 2/2002 | Shimomura et al. | 385/19 |
| 2002/0018265 A1 | * | 2/2002 | Graves | 359/128 |
| 2002/0064336 A1 | * | 5/2002 | Graves et al. | 385/17 |
| 2002/0071627 A1 | * | 6/2002 | Smith et al. | 385/15 |
| 2002/0114035 A1 | * | 8/2002 | Graves et al. | 359/128 |

FOREIGN PATENT DOCUMENTS

| | | | |
|---|---|---|---|
| EP | 1 058 475 A2 | 12/2000 | |
| EP | 1 081 982 A2 | 3/2001 | |
| JP | 08145736 A | * 6/1996 | .......... G01D/21/00 |
| WO | WO 01/33746 A2 | 5/2001 | |
| WO | WO 01/58204 A2 | 8/2001 | |

OTHER PUBLICATIONS

Satoru Okamoto, "Optical path Cross–Connect Node Architectures for Photonic Transport Network", Journal of Lightwave Technology, vol. 14, No. 6, Jun. 1996, pp. 1410–1422, XP000598543.

* cited by examiner

Primary Examiner—Michael G. Lee
Assistant Examiner—Uyen-Chau N. Le
(74) Attorney, Agent, or Firm—Sughrue Mion, PLLC

(57) ABSTRACT

The optical switching device (100) includes:
  an optical switching matrix (1) including:
    input ports (A, B),
    output ports (a, b),
    switching means (3, 3') between the input ports (A, B) and the output ports (a, b), and
  control means (2) for the switching matrix (1),
  and optical paths are defined between the input ports (A, B) and the output ports (a, b) so that data entering via one of the input ports (A, B) is switched by the matrix (1) to exit at one of the output ports (a, b).

The device is characterized in that the control means (2) include at least one configuration table (14) in which are written authorized optical paths producing a transmission error rate lower than a predetermined value.

7 Claims, 2 Drawing Sheets

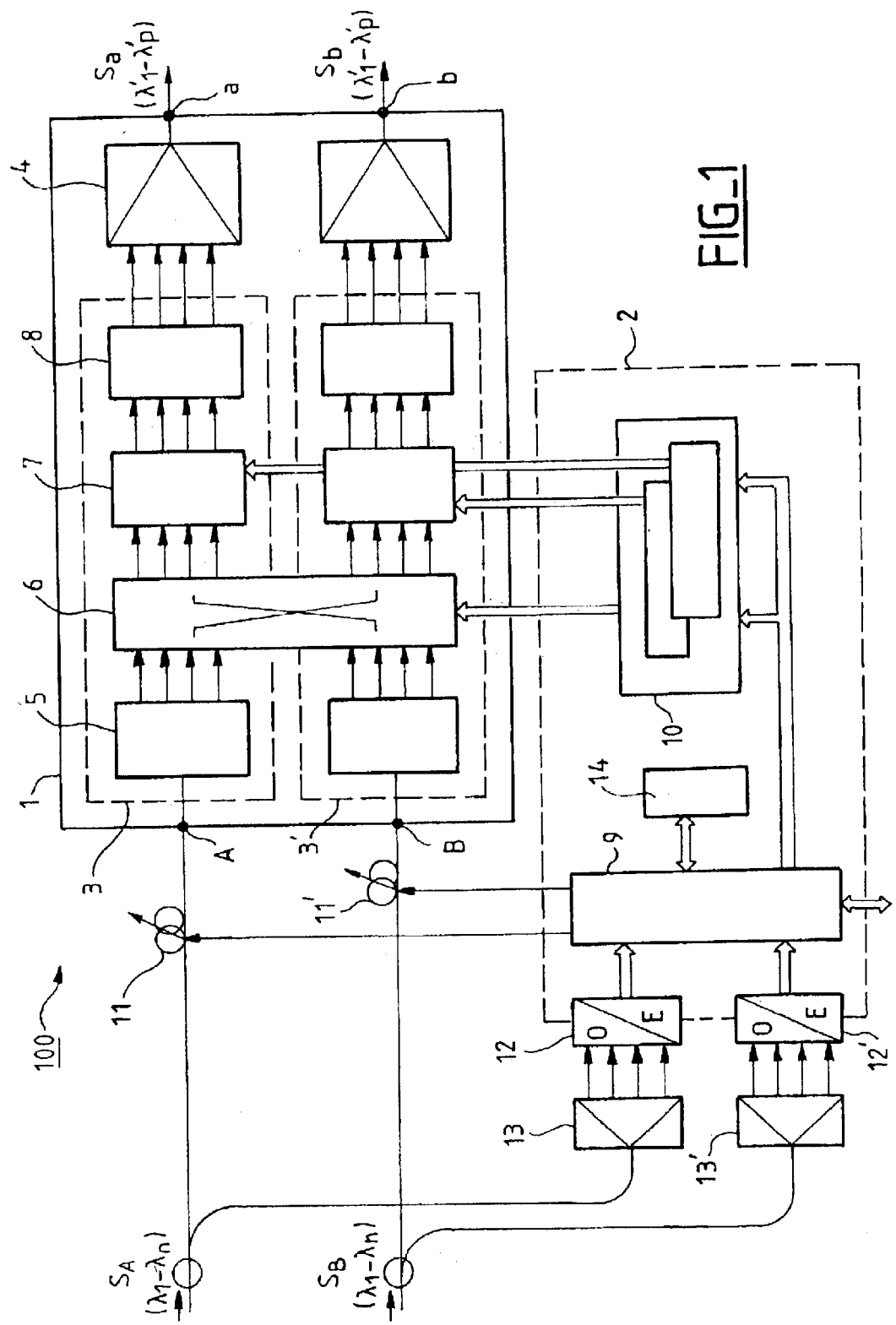
FIG_1

FIG_2

|   |   | A | | | B | | | C | | |
|---|---|---|---|---|---|---|---|---|---|---|
|   |   | $\lambda_1$ | $\lambda_2$ | $\lambda_3$ | $\lambda_1$ | $\lambda_2$ | $\lambda_3$ | $\lambda_1$ | $\lambda_2$ | $\lambda_3$ |
| a | $\lambda_1$ | | | | | | | | | |
|   | $\lambda_2$ | | | | | | | | | |
|   | $\lambda_3$ | | | | | | | X | | |
| b | $\lambda_1$ | | | X | | | | | | |
|   | $\lambda_2$ | | | | | | | | | |
|   | $\lambda_3$ | | | | | | | | | |
| c | $\lambda_1$ | | | | | | | | | |
|   | $\lambda_2$ | | | | | | | | | |
|   | $\lambda_3$ | | | | | | | | | |

OPTICAL SWITCHING DEVICE AND A METHOD OF CONTROLLING THE DEVICE

BACKGROUND OF THE INVENTION

The present invention relates to an optical switching device and to a method of controlling the device. The device and the method are intended to be used in an optical transmission network.

Prior art optical transmission networks using optical switching include nodes provided with fast optical signal switching devices for switching data or groups of data of fixed or varying size. The transmitted groups of data are usually referred to as "packets" in the case of the Internet or "cells" in the case of an ATM network. The field of the present invention includes not only packet switching but also circuit switching.

Optical switching consists of switching data, usually in the form of amplitude modulation of an optical carrier wave, from one optical link to another, preserving its optical nature, i.e. without converting it to the electrical domain. The switching is effected by optical switching devices including a photonic switching matrix. In the case of packet switching, these devices both switch the data and synchronize the packets, in order to manage conflicts so as to minimize losses of packets or data.

In the context of optical telecommunication networks using wavelength division multiplexing (WDM), the matrices are also intended to take account of the spectrum of the signals to be switched, i.e. they include spectrum selection and/or reallocation means using wavelength conversion and selection devices.

Optical switching devices include a number of optical components such as couplers, space switches, optical gates based on semiconductor amplifiers, optical delay lines and, in a WDM context, multiplexers/demultiplexers and tunable or non-tunable laser sources.

Switches must provide a required level of performance in terms of the bit error rate (BER) or the rate of loss of packets in the case of packet switching (complete loss of packets occurs when no physical resource is available for routing packets). This implies quality constraints on the components used such that any optical path in a switch, achieved by cascade coupling and/or activating a plurality of selected components, conforms to the required level of performance.

One prior art solution to this problem consists, when fabricating the device, of sorting the components and retaining only those that offer the best performance, which greatly reduces the fabrication yield and necessitates costly testing. This drawback is particularly critical in the frequent situation in which the components are fabricated in the form of strips grouping together a number of basic components such as lasers or optical gates. Rejecting a single component then leads to rejection of the entire strip.

Another solution is to sort the components and then place them selectively in the device so that any path includes not more than one component offering relatively poor performance, for example. However, this also penalizes the fabrication time and therefore the fabrication cost.

SUMMARY OF THE INVENTION

The object of the present invention is therefore to provide an optical switching device whose performance is acceptable, in particular in terms of the bit error rate, and consistent, regardless of the switching state of the device, without necessitating a rigorous sorting or a specific disposition of the components or hardware redundancy.

To this end the present invention proposes an optical switching device including:
  an optical switching matrix including:
    input ports,
    output ports,
    switching means between said input ports and said output ports, and
  control means for said switching matrix,
    wherein said switching means include a space switch having inputs coupled to respective input ports and outputs coupled to spectrum selector stages, the states of the space switch and the spectrum selector stages thus defining optical paths between said input ports and said output ports so that incoming data at one of said input ports can be selectively switched to any of said output ports, which device is characterized in that it includes at least one configuration table in which is written data identifying authorized optical paths ensuring a transmission error rate lower than a predetermined value and said control means cooperate with said configuration table to authorize only states of the space switch and the spectrum selector stages corresponding to authorized optical paths.

Thus a device according to the invention can be fabricated from available components, without rigorous preselection or special dispositions of the components. It is sufficient to determine, after installing the components, the optical paths offering insufficient performance and to exclude them from the configuration table. In this way, the control means can take this information into account and route switch data only to predetermined authorized paths, which ensures a required level of performance.

The configuration table can be programmed during fabrication and can also be modified during operation of the device, by means of regular updates, to take account of the evolution of the device in operation. For example, if aging causes deterioration of the characteristics of some components, making the performance of some paths inadequate, it is then sufficient merely to modify the configuration table accordingly.

The invention exploits the fact that the transmission resources (wavelengths, bands of wavelengths, fibers, or times in the case of packet switching) can be "non-dedicated" at the output, i.e. not strictly tied to specific destinations of the signals to be transmitted in the network. In other words, the invention offers the possibility of prohibiting the worst paths although, because of the non-dedication of resources, they are not strictly indispensable for the information to reach the respective destinations.

There is advantageously at least one authorized optical path between each input port and each output port. This avoids excessively limiting the functionality of the device.

One advantageous embodiment includes configuration tables corresponding to respective different classes of quality of service.

Furthermore, the switching means can include wavelength converter stages coupled to the downstream side of said spectrum selector stages.

One advantageous embodiment includes wavelength converter means at the input of said matrix.

Other features and advantages of the present invention will become more apparent in the course of the following description of one embodiment of the present invention, which is given by way of illustrative and nonlimiting example.

BRIEF DESCRIPTION OF THE DRAWINGS

In the accompanying drawings:

FIG. 1 shows diagrammatically a device in accordance with the invention intended to be used in a packet switching WDM network, and FIG. 2 shows an example of a configuration table stored in memory in control means of the FIG. 1 device.

Items common to both figures are identified by the same reference symbol.

DETAILED DESCRIPTION OF EMBODIMENTS

FIG. 1 shows a device 100 in accordance with the invention in the case of a packet switching WDM network.

The device includes a switching matrix 1 and an associated electronic control unit 2. The matrix 1 has a plurality of input ports and a plurality of output ports. For clarity, only two inputs A and B and two outputs a and b are shown in FIG. 1.

The inputs A and B receive respective WDM optical input signals $S_A$ and $S_B$ and the outputs a and b supply respective WDM optical output signals $S_a$ and $S_b$. The signals $S_A$ and $S_B$ are each formed of a number of spectral components that can be carried by n respective input wavelengths assigned to n spectral channels. Likewise, the output signals $S_a$ and $S_b$ are formed of spectral components that can be carried by p respective output wavelengths.

The matrix 1 generally has the same numbers of inputs and outputs and includes switching modules 3, 3' each associated with one input/output pair.

The signals $S_A$ and $S_B$ are coupled to the respective modules 3, 3' by respective variable delay lines 11, 11' and to optical/electrical converter means 12, 12' of the control unit 2 by demultiplexers 13, 13'.

The switching matrix 1 includes, coupled in cascade, sets of delay lines 5 each belonging to one of the modules 3, 3', a common space switch 6, spectrum selector stages 7, spectrum reallocation stages 8 for effecting wavelength conversion, and output coupling stages 4 for each of the modules.

The electronic control unit 2 includes a processor unit 9 connected to the outputs of the converter means 12, 12' and to a control circuit 10.

A first function of the processor unit 9 is to decode the various packet headers received to extract the respective destinations therefrom. As a function of this destination information and predefined information relating to the architecture of the network, the unit 9 executes an algorithm for managing conflicts to determine, for each received packet carried by each wavelength, to which output port of the matrix and at what time the packet must be directed. This information is sent to the control circuit 10, which then sends an appropriate control signal to the space switch 6 and to the spectral selector stages 7.

Accordingly, as a function of the state of the space switch 6 and the wavelengths selected by the various selectors 7, each data packet carried by any wavelength belonging to any input multiplex can, after an appropriate time-delay, be routed to any output of the matrix and, thanks to the wavelength converter stages, be carried at the output by a new wavelength. It is therefore possible to transfer to any chosen output a chosen packet belonging to a chosen spectral channel of a chosen input multiplex. The various states of the space switch 6 and the spectrum selector stages 7 thus define a plurality of optical paths (or routes) between the input ports A, B and output ports a, b.

In the case of a conventional switching device, all the resources of the switching matrix 1 managed by the control unit 2 con be used. This means that all the predefined optical paths in the device can be used.

On the other hand, according to the invention the processor unit 9 further cooperates with a configuration table 14 which identifies the various authorized optical paths, i.e. the paths for which the transmission error rate is lower than a predetermined value. This limit error rate value is normally imposed at the outputs of the switching device and is defined by an agreed specification.

In practice, the identification of these paths is the result of a series of conventional error rate measurements carried out on all possible paths by successively activating them. The authorized optical paths are deduced as a function of the results obtained and the error rate limit, and the table 14 is constructed in the form of records in a path identification data memory.

The resulting table can be contained in a dedicated memory module, in which case access means are conventionally provided to enable the processor unit 9 to read this data. Another possibility is for the table simply to be contained in a reserved memory area of a data memory belonging to the processor unit 9.

Finally, the algorithm is of course adapted to take account of this supplementary information. All these adaptations to implement the invention will be evident to the person skilled in the art and thus do not require a more detailed explanation.

In an advantageous embodiment taking account of the fact that the network may be intended to provide different quality of service levels, there can be a plurality of tables such as the table 14, corresponding to respective different classes of quality of service, i.e. corresponding to respective different predetermined limit values for the transmission error rate. Accordingly, the algorithm takes account of the data entered in the table associated with the class of service to be provided.

FIG. 2 is a diagrammatic illustration of one example of a configuration table 14.

This example corresponds to a spectral space switching matrix 1 with three input ports A, B and C and three output ports a, b and c, with three wavelengths $\lambda_1$ to $\lambda_3$ for carrying a signal present at each input and output port. Thus the matrix has 81 paths corresponding to the entries of the table shown in FIG. 2.

A path is created firstly by setting the space switch 6 so that it couples an input port, for example the port A, to one or more wavelength selectors of the spectral selector stage 7 associated with one of the output ports, for example the port b. Secondly, the wavelength selector is commanded to transmit the particular wavelength which carries the signal to be carried by that path, for example the wavelength $\lambda_3$. Finally, the wavelength converter of the stage 8 coupled to the output of the wavelength selector delivers the same signal but carried by an output wavelength, for example the wavelength $\lambda_1$. After carrying out the physical tests applying to the various paths across the matrix, it is found that some paths yield too high an error rate. They must therefore be prohibited. This information is therefore recorded in the configuration table 14, as shown in FIG. 2 by crosses in the corresponding boxes.

Accordingly, if the qualities of the wavelength selector $\lambda_3$ and/or the wavelength converter $\lambda_1$ of the preceding example are inadequate and/or if the coupling between the wavelength selector and the space switch 6 introduces high losses, it may be necessary to avoid that path. In this case, to reach the port b from the input port A (wavelength $\lambda_3$), the wavelengths $\lambda_2$ and $\lambda_3$ can be used at the output port b, but not the wavelength $\lambda_1$. Accordingly, even if some paths are prohibited, complete connection of the matrix is assured anyway, i.e. any input data can be guided to each output, because the physical resource consisting of the output wavelength is not dedicated.

Note that this concept of non-dedication of resources can equally apply to the output ports, given that in a transmission network there is generally a plurality of routes to a final destination. Thus the total prohibition of an output port does not necessarily imply that it is impossible to access some destinations.

However, to avoid depriving the matrix 1 of too much functionality, it is preferable to ensure, by partial selection of components, that at least one optical path is available for each input-output combination (A-a, A-b, . . . , C-b, C-c).

It must be noted that the selective invalidation of paths proposed by the invention is not equivalent to individually and permanently taking out of service some components or some links internal to the matrix. This is because it is possible for a component of degraded quality to remain usable, but only in paths where the other components and/or links are of sufficient quality to compensate its degraded quality, so that overall each of the paths has the required quality. As a result of this the components of the matrix are used in optimum fashion.

Likewise, neither is the solution in accordance with the invention that takes account of interconnections within the matrix (i.e. in fact the various internal routes available for signals) equivalent to providing complete path redundancy, for example by duplicating the matrix, so as to be able to replace effective paths with totally redundant paths, without reducing functionality.

Of course, the invention is not limited to the embodiment that has just been described. The invention applies to any spectral switching (WDM) switching system, whether using packet switching or not. In the latter case, a non-dedicated supplementary resource is provided, namely the timing resource materially represented by the sets of delay lines 5 in FIG. 1.

How to adapt the device to all cater for the above possibilities will be evident to the person skilled in the art.

Also, to increase flexibility, it is possible to place the wavelength converters (not shown in FIG. 1) at the input of the matrix 1; thus an input wavelength can be modified, for example, if it is found that some output ports are inaccessible for that input wavelength. In this case the input wavelength is also "non-dedicated".

Finally, any means can be replaced by equivalent means without departing from the scope of the invention.

What is claimed is:

1. An optical switching device (100) including:
    an optical switching matrix (1) including:
        input ports (A, B),
        output ports (a, b),
        switching means (3, 3') between said input ports (A, B) and said output ports (a, b), and
    control means (2) for said switching matrix (1),
    wherein said switching means (3, 3') include a space switch (6) having inputs coupled to respective input ports (A, B) and outputs coupled to spectrum selector stages (7), the states of the space switch (6) and the spectrum selector stages (7) thus defining optical paths between said inpul ports (A, B) and said output ports (a, b) so that incoming data at one of said input ports (A, B) can be selectively switched to any of said output ports (a, b),
    said optical switching device including at least one configuration table (14) in which is written data identifying authorized optical paths ensuring a transmission error rate lower than a predetermined value and said control means (2) cooperating with said configuration table (14) to authorize only states of the space switch (6) and the spectrum selector stages (7) corresponding to authorized optical paths.

2. The optical switching device according to claim 1, characterized in that there is at least one authorized optical path between each input port (A, B) and each output port (a, b).

3. The optical switching device according to claim 1, characterized in that it includes configuration tables (14) corresponding to respective different classes of quality of service.

4. The optical switching device according to claim 1, characterized in that it includes wavelength converter means at the input of said matrix (1).

5. The optical switching device according to claim 1, characterized in that it includes wavelength converter stages (8) coupled to the downstream side of said spectrum selector stages (7).

6. The optical switching device according to claim 1, characterized in that the data in the configuration table comprise an indication for each of a plural optical paths indicating whether the optical path is authorized.

7. The optical switching device according to claim 1, characterized in that, the authorized optical paths correspond to different combinations of inputs of the space switch and outputs of the spectrum selector stages, and at least one of the inputs or outputs is on both an authorized optical path and an unauthorized optical path.

\* \* \* \* \*